United States Patent [19]
Boscaljon et al.

[11] Patent Number: 5,871,239
[45] Date of Patent: Feb. 16, 1999

[54] POSITIVE LOCK COUPLING

[75] Inventors: Ronald W. Boscaljon, Denver; Ronald A. Rossway, Aurora; David E. Jewell, Golden, all of Colo.

[73] Assignee: Stanley Aviation Corporation, Aurora, Colo.

[21] Appl. No.: 741,647

[22] Filed: Oct. 31, 1996

[51] Int. Cl.[6] ...................................................... F16L 35/00
[52] U.S. Cl. ................................ 285/81; 285/92; 285/354
[58] Field of Search ............................... 285/92, 233, 81, 285/86, 354

[56] References Cited

U.S. PATENT DOCUMENTS

| | | | |
|---|---|---|---|
| 3,201,149 | 8/1965 | Bragg | 285/86 |
| 3,999,825 | 12/1976 | Cannon | 339/15 |
| 4,008,937 | 2/1977 | Filippi | 339/15 |
| 4,249,786 | 2/1981 | Mahoff | 339/15 |
| 4,285,564 | 8/1981 | Spinner | 339/89 |
| 4,346,428 | 8/1982 | Gale | 361/261 |
| 4,757,593 | 7/1988 | Pallini, Jr. et al. | 285/92 |
| 4,785,858 | 11/1988 | Valentini et al. | 285/92 |
| 4,808,117 | 2/1989 | Gale et al. | 439/192 |
| 4,881,760 | 11/1989 | Runkles et al. | 385/93 |
| 4,900,070 | 2/1990 | Runkles et al. | 285/233 |
| 4,928,202 | 5/1990 | Gale et al. | 361/215 |
| 5,188,398 | 2/1993 | Parimore, Jr. et al. | 285/92 |
| 5,215,336 | 6/1993 | Worthing | 285/92 |
| 5,348,349 | 9/1994 | Sloane | 285/92 |
| 5,350,200 | 9/1994 | Peterson et al. | 285/92 |

FOREIGN PATENT DOCUMENTS 99293  1/1984  European Pat. Off. ................. 285/92

Primary Examiner—Eric K. Nicholson
Attorney, Agent, or Firm—Fields and Johnson, P.C.

[57] ABSTRACT

A threaded coupling assembly is provided for interconnecting the ends of first and second fluid-carrying conduit members in fixed releasably locking relationship. First and second coupling members are circumferentially engageable with the ends of the conduit members to hold them in fluid communication. The coupling members are rotatable in a locking direction and in an opposite unlocking direction. The first coupling member has a peripheral facing surface with a pair of annular slots, each of a different length and width. The second coupling member has a lock ring longitudinally slidable thereon with a facing surface having a pair of annular raised locking tabs. Each locking tab is of a predetermined height but of a different length and width which corresponds to the respective length and width of the annular slots. A resilient annular spring urges the lock ring toward the first coupling member so that the locking tabs engage their respective slots when the coupling is tightened to a predetermined extent during rotation in the locking direction to releasably and positively lock the coupling. An indicator stripe is provided on the peripheral edge of the first coupling member which is exposed before the locking tabs and slots are engaged. The indicator stripe is no wider than the height of the locking tabs so that it is covered by the lock ring when the lock ring snaps into locking engagement to provide a visual indication to the mechanic that the coupling assembly is positively locked.

17 Claims, 14 Drawing Sheets

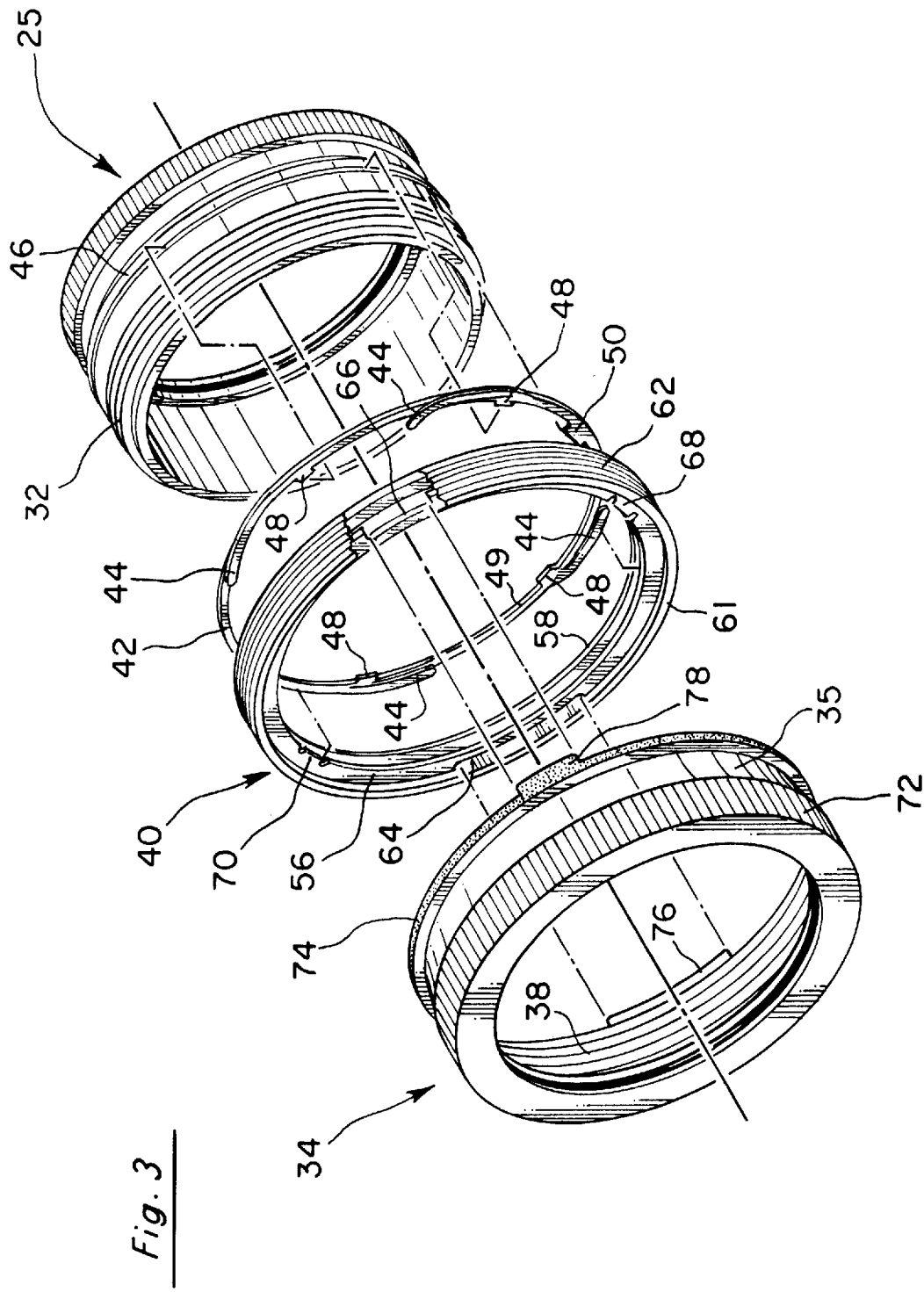

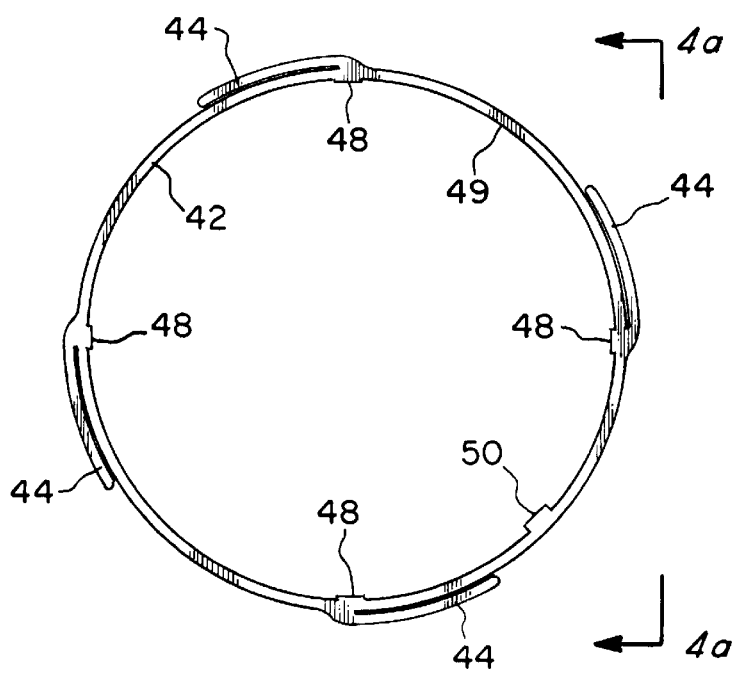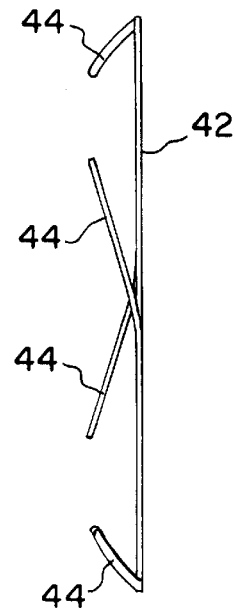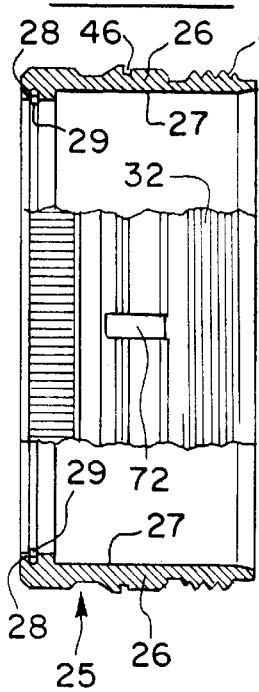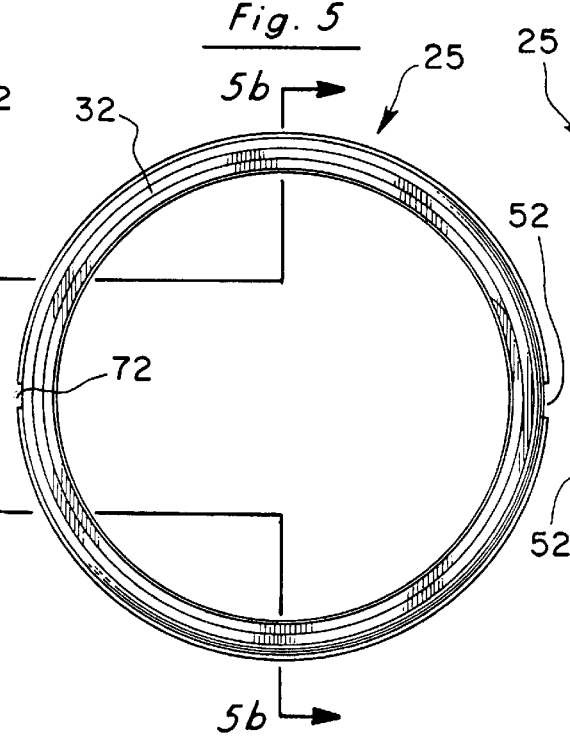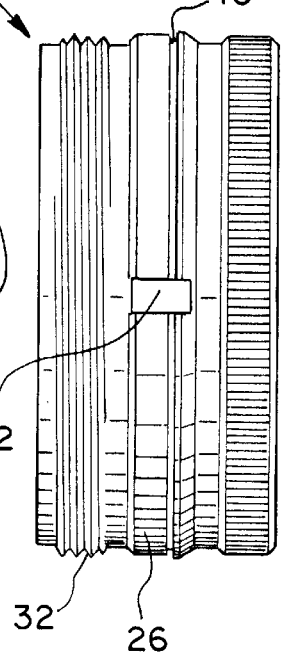

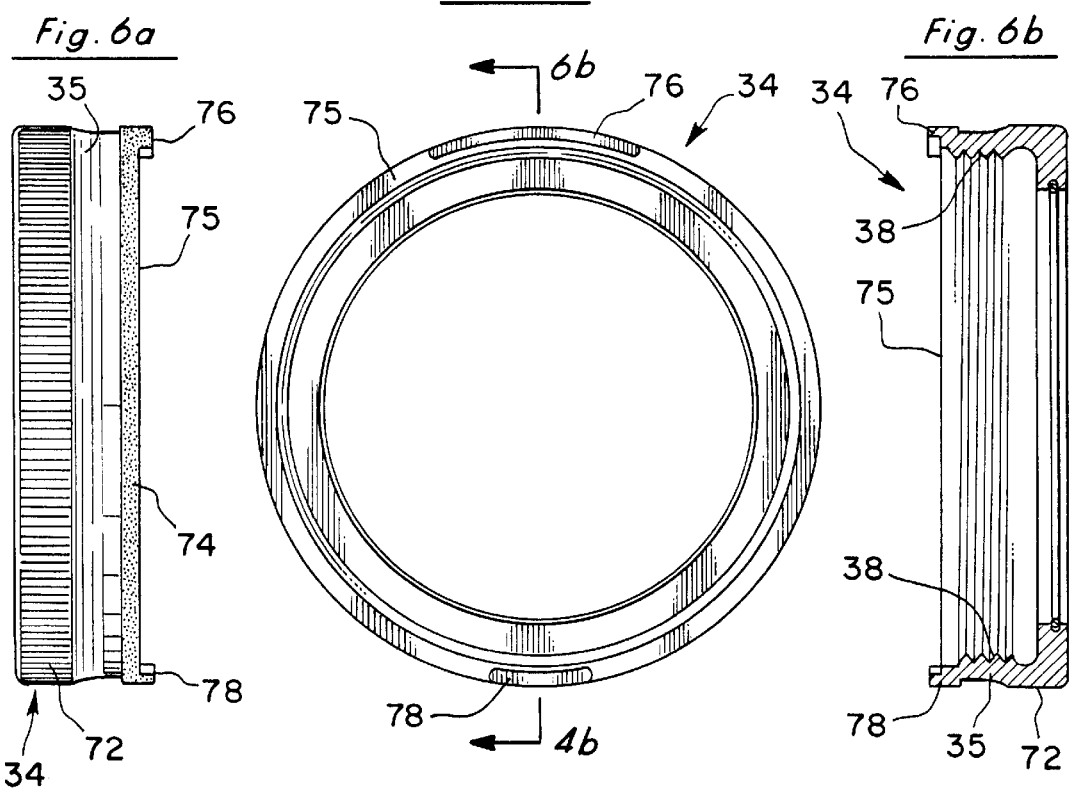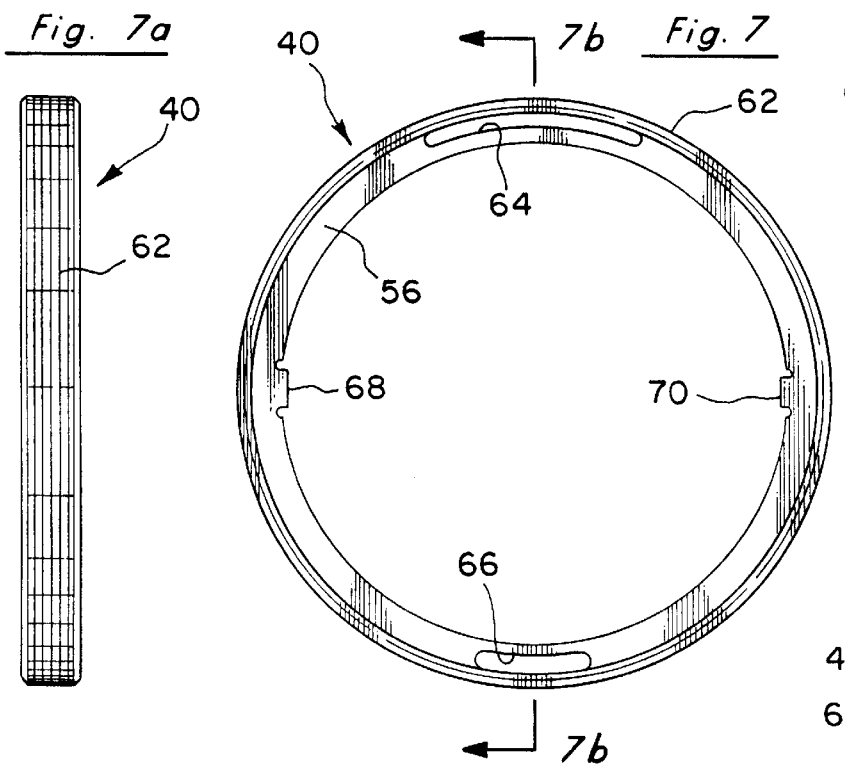

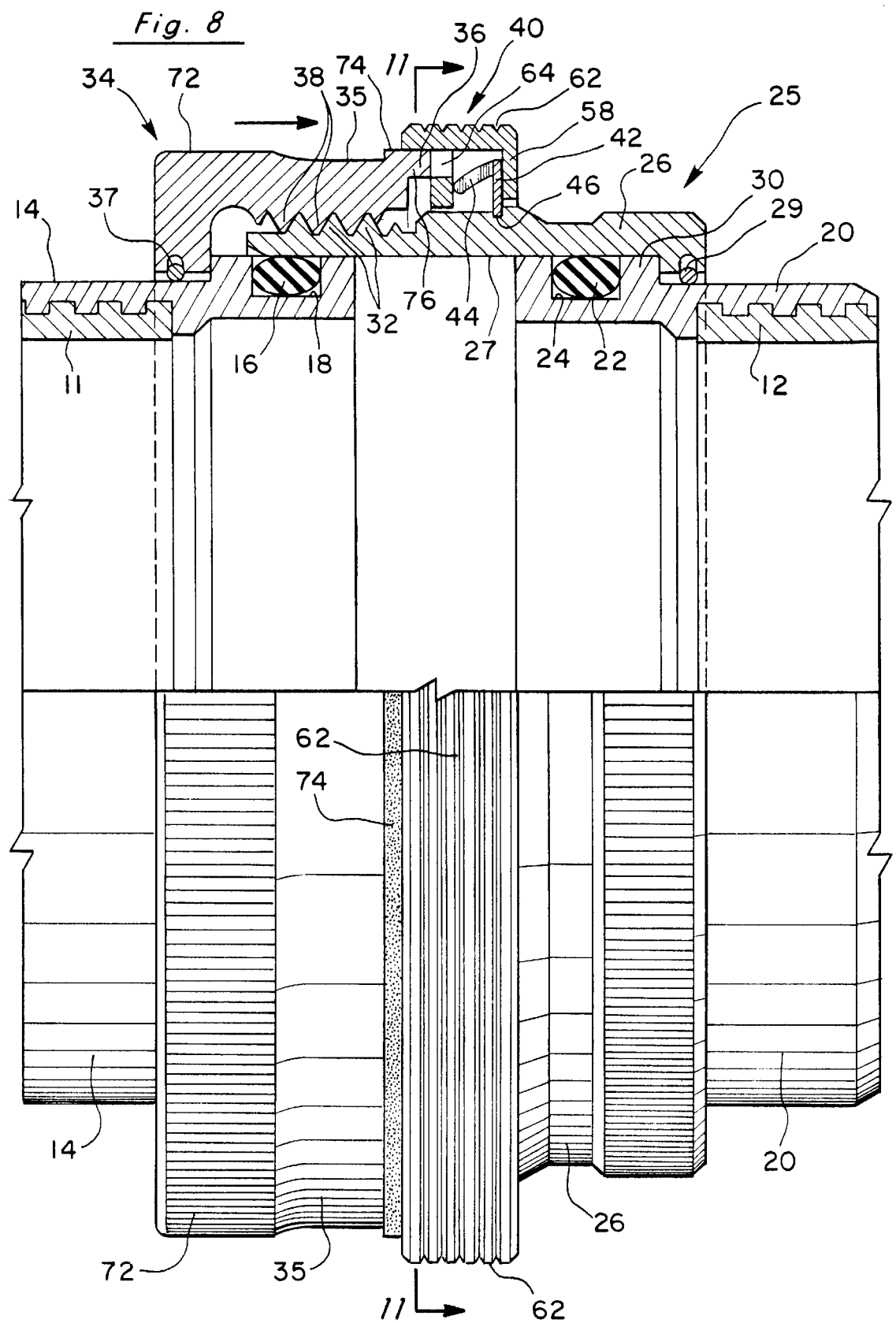

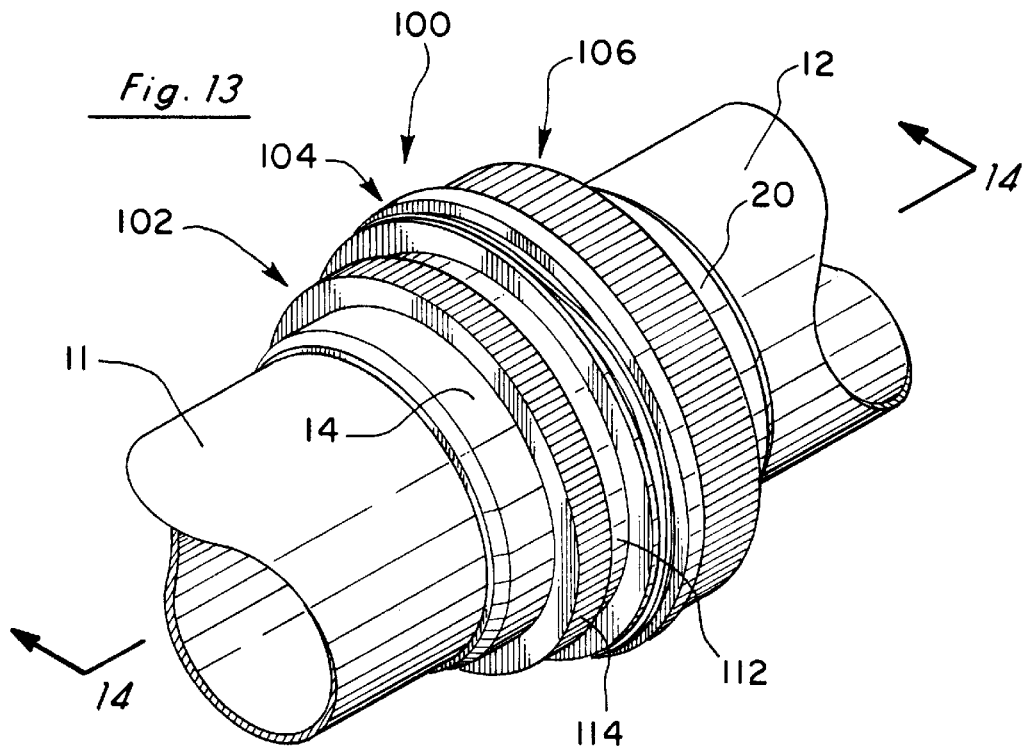
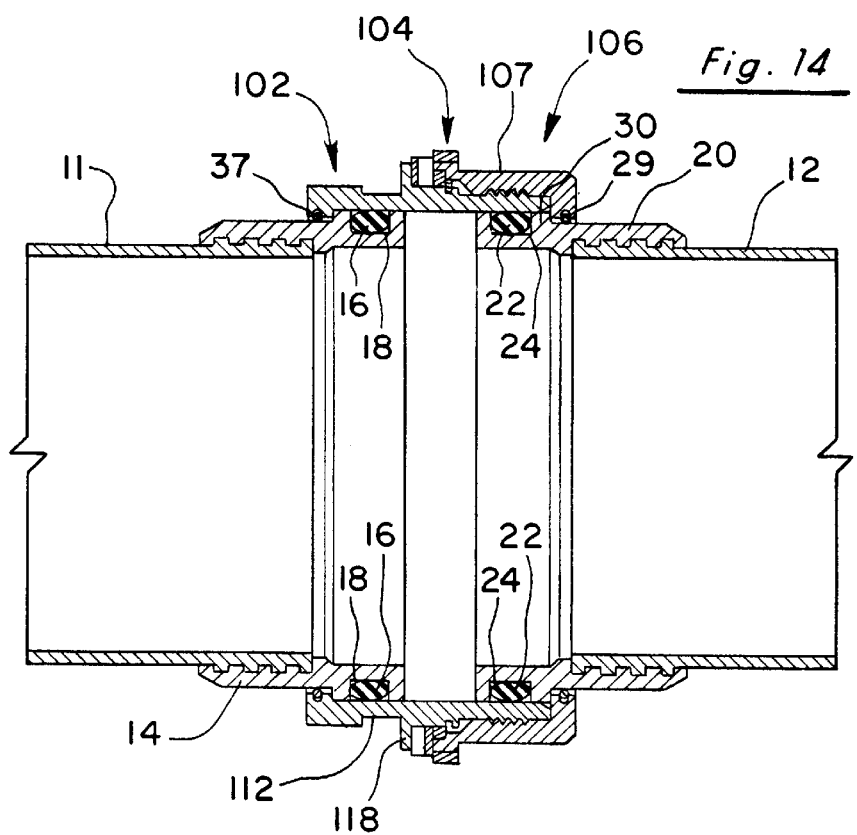

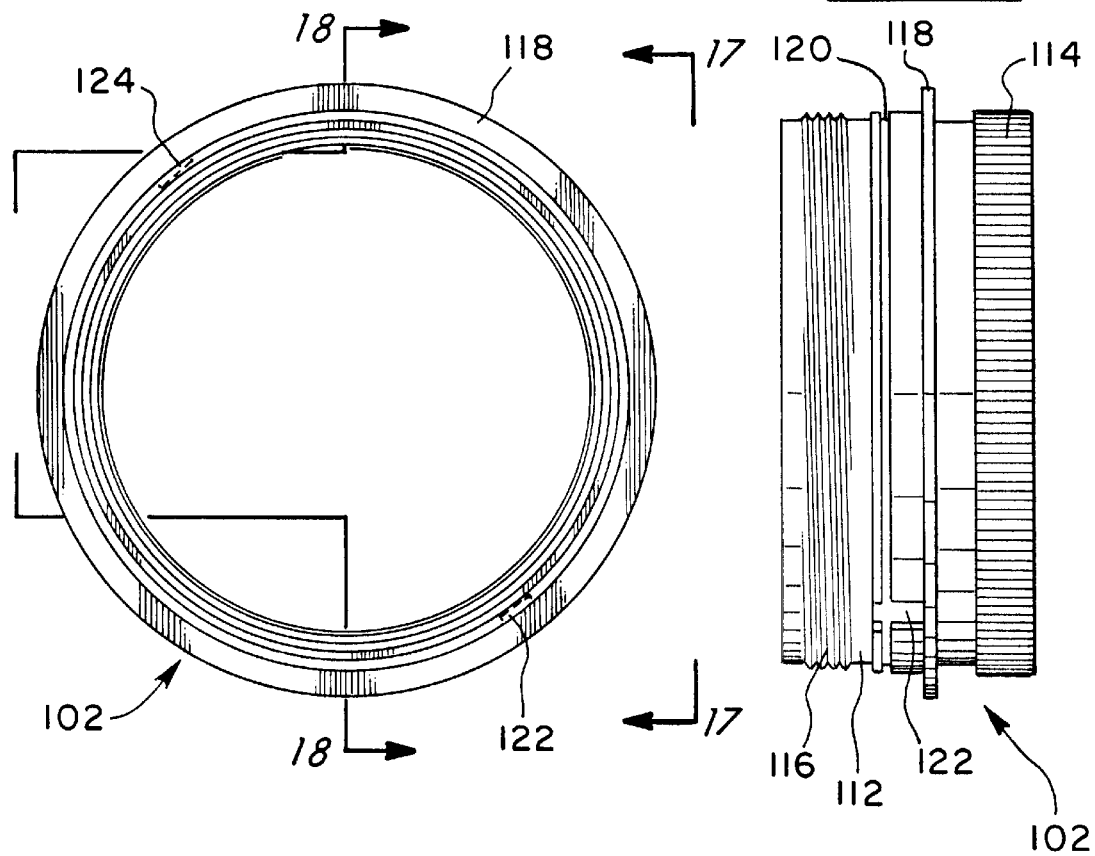
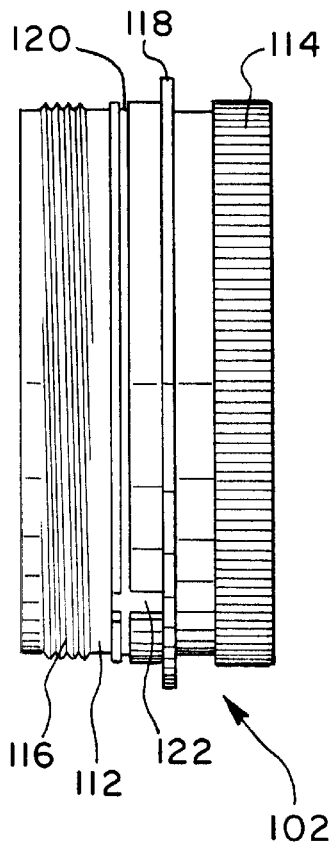
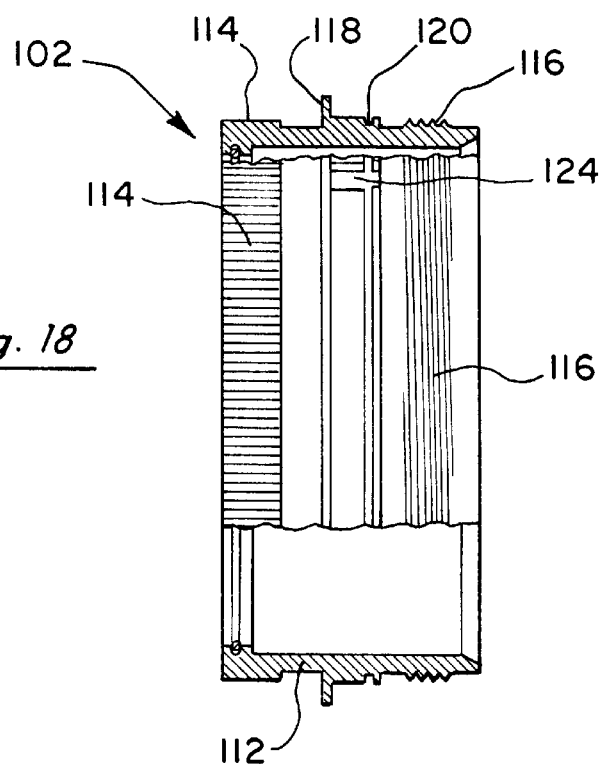

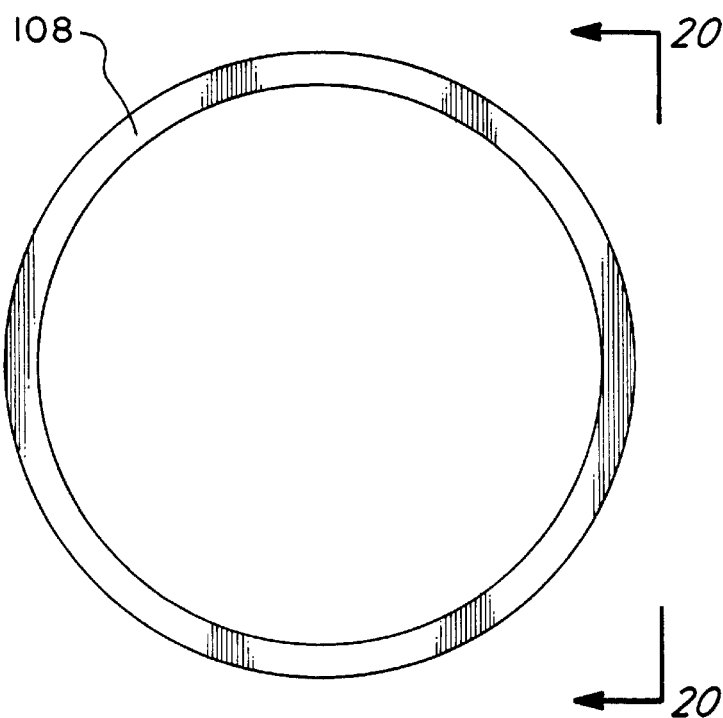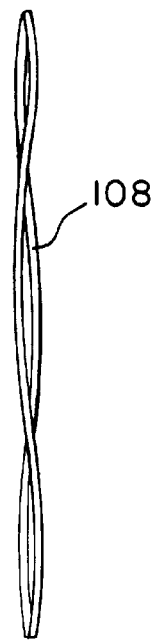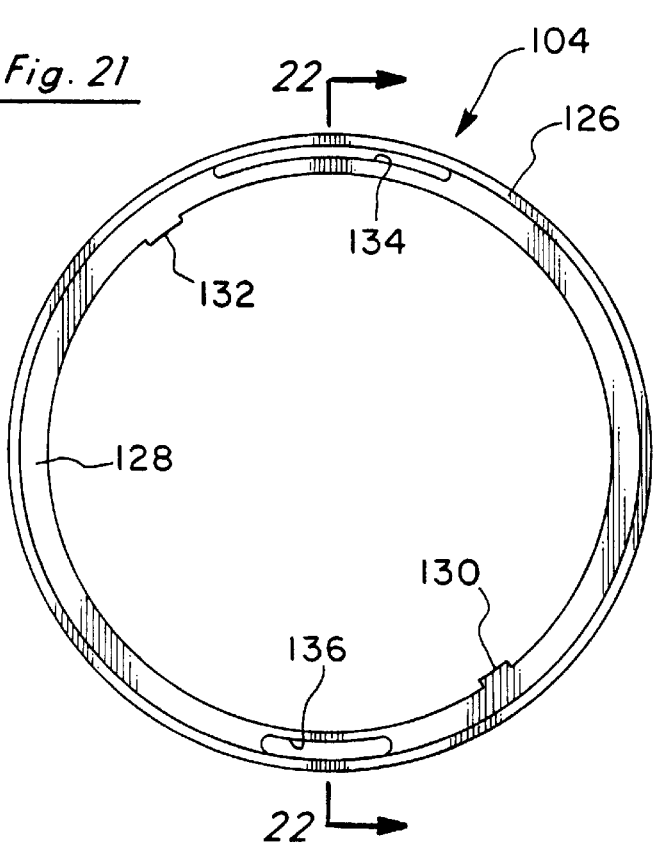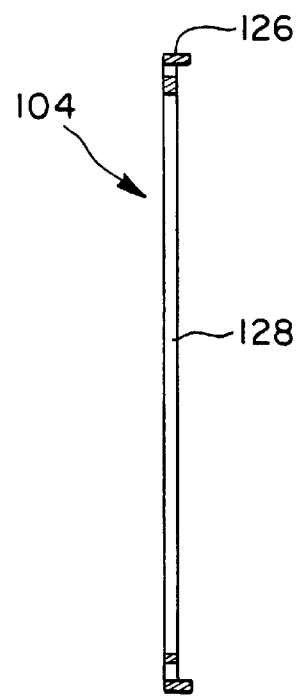

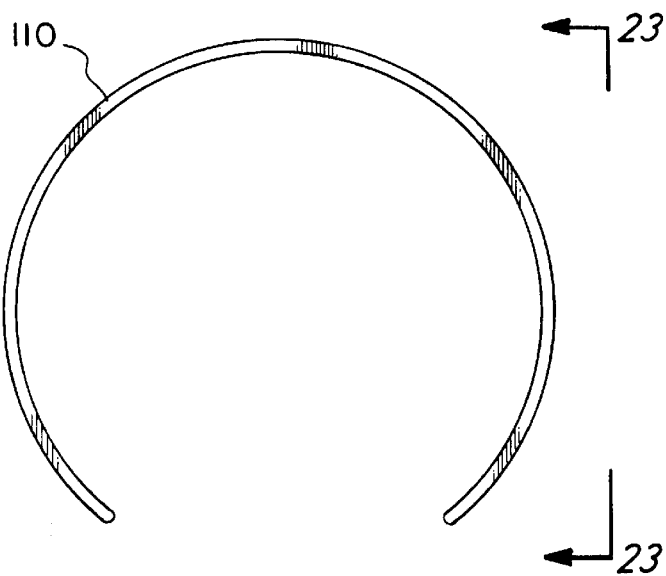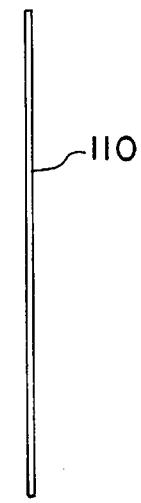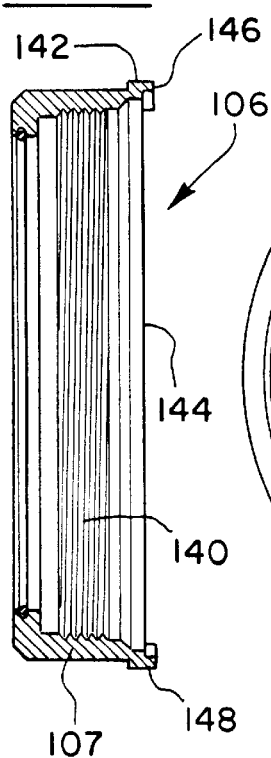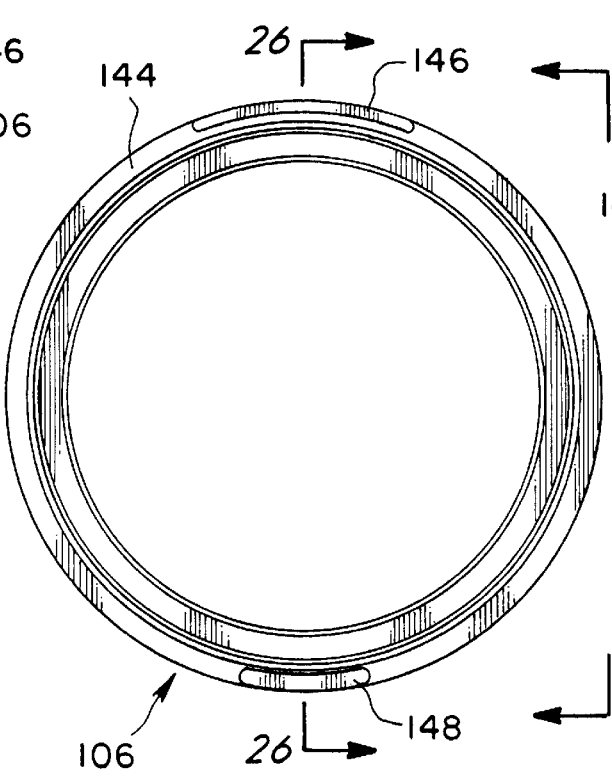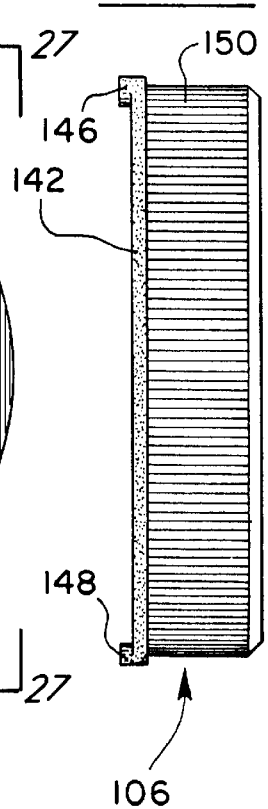

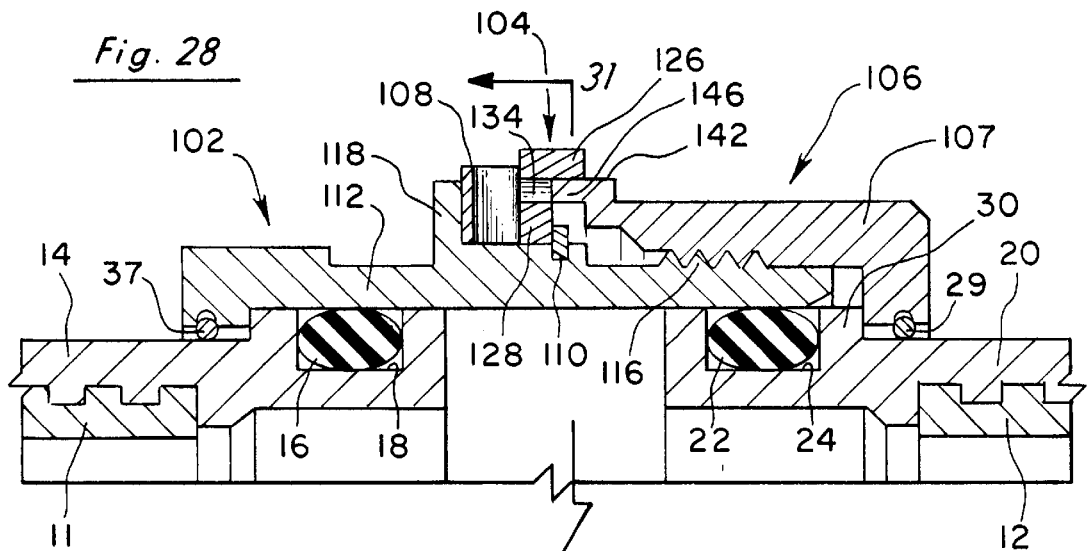
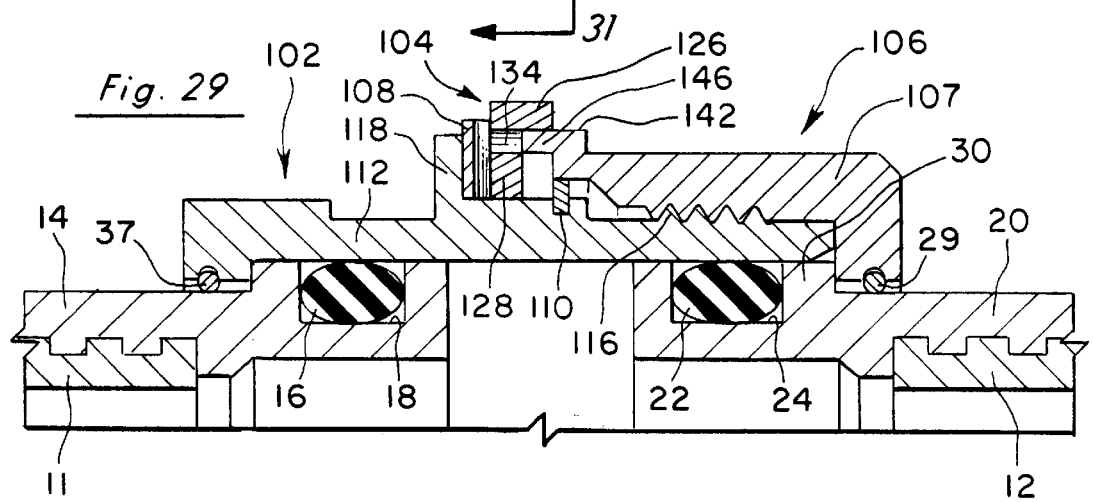
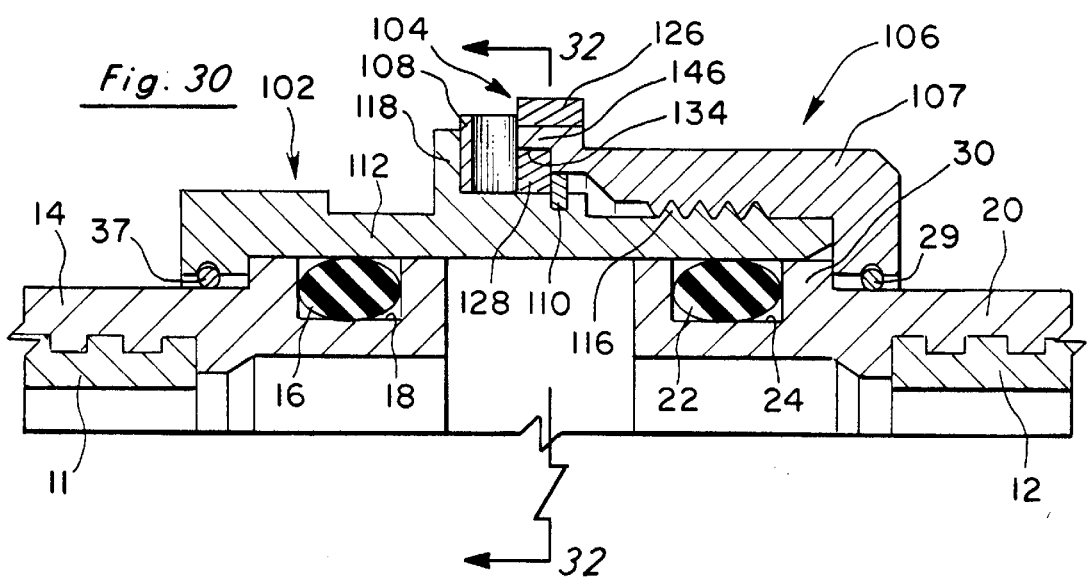

POSITIVE LOCK COUPLING

TECHNICAL FIELD

This invention relates to a threaded coupling assembly for interconnecting confronting ends of first and second fluid-carrying conduits in an aircraft. More particularly, the coupling assembly has a releasably positive lock which assures that the coupling will not accidentally become uncoupled due to vibration of the aircraft and includes indicia so that the mechanic can visually observe whether or not the coupling is positively locked.

BACKGROUND ART

Aircraft fuel systems include a large number of couplings which must be easy to connect, must provide a positive lock when connected and should include means for visually determining whether or not the coupling is secure. Also, because of the tight space constraints within an aircraft, the mechanic preferably should be able to lock and unlocked the coupling assembly with one hand. Various couplings have been developed with one or more of these objectives in mind.

Nadsady U.S. Pat. No. 3,669,472; Gale et al. U.S. Pat. No. 4,808,117 and Gale et al. U.S. Pat. No. 4,928,202 each disclose a coupling device in which the tightening of the coupling parts is readily accomplished but accidental loosening is restrained by spring fingers carried by one of the coupling parts which engage indentations or notches on the other coupling part in such a manner as to favor relative rotation of the coupling parts in the tightening direction while restraining with greater force the rotation of the coupling parts in the opposite unlocking direction.

Cannon U.S. Pat. No. 3,999,825; Filippi U.S. Pat. No. 4,008,937; Mahoff U.S. Pat. No. 4,249,786 and Gale U.S. Pat. No. 4,346,428 each disclose a coupling with one or more toggle latches which snap into a positive locking position.

Spinner U.S. Pat. No. 4,285,564 discloses a coaxial plug connector wherein a first ring of axially pointed teeth is provided around the circumference of a cap ring. A first connector has a ring with teeth for engaging the teeth on the cap ring. The cap ring is withdrawn axially against the force of a biasing spring when the coupling is rotated to a different position. The cap ring is released and the spring urges it into locking engagement with the tooth ring. Thus, accidental rotation of the cap ring relative to the first connector is prevented.

Runkles et al. U.S. Pat. No. 4,881,760 discloses a coupling with locking tines having visible indicia for determining whether or not the tines are in locked position.

Runkles et al. U.S. Pat. No. 4,900,070 discloses a coupling with spring biased rotatable locking tines.

Although each of the prior art references is suitable for its intended purpose, none meet the need for a positive lock on a threaded coupling which is easy to secure with one hand, and, on the other hand, provides a positive but releasable locking connection which has indicia to indicate whether or not the positive lock feature is engaged.

DISCLOSURE OF THE INVENTION

In accordance with the present invention, a threaded coupling assembly is provided for interconnecting the ends of first and second fluid-carrying conduit members in fixed releasably locking relationship. First and second coupling members are provided for circumferentially engaging ends of the conduit members to hold them in fluid communication. Conveniently, the coupling members are rotatable in both a locking direction and an opposite unlocking direction. Each of the first and second coupling members has a peripheral facing surface with a complementary locking element thereon. A resilient member urges the peripheral facing surfaces toward each other so that at least one of the locking elements on one of the peripheral facing surfaces engages the other peripheral facing surface during rotation in the locking direction to bring the locking elements into aligned locking engagement.

More particularly, a relief is provided by a first peripheral surface which is in the form of a first arcuate slot having a particular length and width. A first protrusion is provided by a second confronting peripheral surface in the form of a first locking tab which is sized and configured to be received within the first arcuate slot. Advantageously, a second arcuate slot can be provided on the first peripheral surface peripherally spaced from the first arcuate slot and having a different length and width than the first arcuate slot. A second protrusion is provided on the second confronting peripheral surface in the form of a second locking tab which is sized and configured to be received within the second arcuate slot. Because of the differences in sizes of the respective slots and locking tabs, the first locking tab cannot enter the second slot and the second locking tab cannot enter the first slot. Thus, the coupling members must be rotated in the locking direction sufficiently for the locking tabs to be aligned with their corresponding slots before locking engagement can occur. In this way, it is possible to provide a secure, but releasable, lock on a fluid coupling.

A lock ring is mounted around and secured to one of the coupling members and has one of the confronting faces positioned thereon. A resilient member in the form of an annular ring urges the lock ring toward the confronting face of the other coupling member. Thus, proper alignment between the locking tabs on corresponding confronting faces results in engagement between the respective locking tabs and slots when they are aligned.

Conveniently, indicia in the form of an indicator stripe may be provided around the outer peripheral surface of coupling member whose face is engaged against the face of the lock ring. This indicator stripe has a maximum width equal to the height of the locking tabs and corresponding to the pitch of the threads. Thus, during rotation of the coupling members in the locking direction, the indicator stripe will be exposed thus indicating that a positive locking engagement between the coupling members has not yet been achieved. However, when the locking tabs become aligned with the corresponding arcuate slots of complementary size and shape, the lock ring will suddenly move longitudinally a distance equal to the height of the locking tabs and cover the indicator stripe. When the indicator stripe can no longer be seen, a mechanic knows that positive locking engagement of the coupling has occurred.

Additional advantages of this invention will become apparent from the detailed description which follows, taken in conjunction with the accompanying drawings.

BRIEF DESCRIPTION OF THE DRAWINGS

FIG. 3 is an exploded perspective view of the coupling of FIG. 1;

FIG. 4 is a front elevation of the annular spring for the lock ring of the embodiment of FIG. 1;

FIG. 4a is a right side elevation of the annular spring taken in the direction of line 4a—4a in FIG. 4;

FIG. 5 is a front elevation of the coupler of the embodiment of FIG. 1;

FIG. 5a is a right side elevation of the coupler of FIG. 5;

FIG. 5b is an offset vertical section, taken along line 5b—5b of FIG. 5;

FIG. 6 is a front elevation of the nut of the embodiment of FIG. 1;

FIG. 6a is a left side elevation of the nut of FIG. 6;

FIG. 6b is a vertical section taken along line 6b—6b of FIG. 6;

FIG. 7 is a front elevation of the lock ring of the embodiment of FIG. 1;

FIG. 7a is a left side elevation of the lock ring of FIG. 7;

FIG. 7b is a vertical section taken along line 7b—7b of FIG. 7;

FIG. 8 is a greatly enlarged side elevation of the coupling shown in FIG. 2 as the threading of the coupling assembly in the locking direction is begun, with parts broken away for clarity of illustration;

FIG. 13 is a perspective view of a second embodiment of the coupling assembly of this invention;

FIG. 14 is a longitudinal section, taken along line 14—14 of FIG. 13;

FIG. 16 is a front elevation of the coupler of the embodiment of FIG. 13;

FIG. 17 is a right side elevation of the coupler of FIG. 16, taken in the direction of line 17—17;

FIG. 18 is an offset vertical section of the coupler, taken along line 18—18 of FIG. 16;

FIG. 19 is a front elevation of the annular spring for the embodiment of FIG. 13;

FIG. 20 is a right side elevation, taken in the direction of line 20—20 of FIG. 19;

FIG. 21 is a front elevation of the lock ring of the embodiment of FIG. 13;

FIG. 22 is a vertical section, taken along line 22—22 of FIG. 21;

FIG. 23 is a front elevation of split retaining ring for the embodiment of FIG. 13;

FIG. 24 is a right side elevation, taken in the direction of line 24—24 of FIG. 23;

FIG. 25 is a front elevation of the nut for the embodiment of FIG. 13;

FIG. 26 is a vertical section, taken along line 26—26 of FIG. 25;

FIG. 27 is a right side elevation, taken in the direction of line 27—27 of FIG. 25;

FIG. 28 is an enlarged fragmentary vertical section through the coupling of FIG. 13 showing the position of the lock ring as it is brought into contact as the coupling is threaded in the locking direction;

FIG. 29 is an enlarged fragmentary vertical section, similar to FIG. 28, but showing the position of the coupling assembly just prior to coming into locking engagement;

FIG. 30 is an enlarged fragmentary vertical section, similar to FIGS. 28 and 29, but showing the position of the coupling assembly in locking engagement;

BEST MODE FOR CARRYING OUT THE INVENTION

Figure 1:
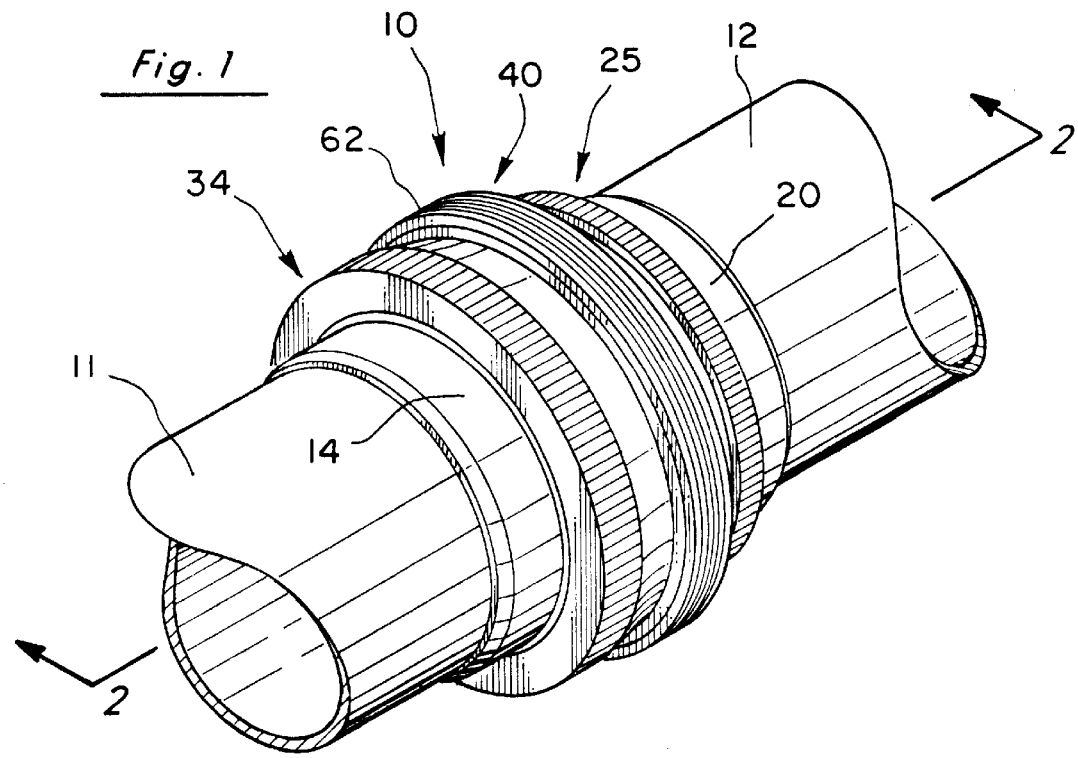
FIG. 1 is a perspective view of one embodiment of the coupling of the present invention.

In accordance with this invention, a coupling assembly 10 is provided for interconnecting fluid carrying tubes or conduits 11 and 12 in fluid communicating relationship. Conduit 11 has a peripheral sealing flange 14 securely attached thereto which includes an O-ring 16 within peripheral groove 18. Similarly, conduit 12 has a peripheral sealing flange 20 securely attached thereto which includes an O-ring 22 within peripheral groove 24.

Conveniently, coupling assembly 10 has a first coupling member, such as coupler 25 having a generally cylindrical body 26 whose inner surface 27 is in fluid-tight relationship with O-rings 16 and 22, respectively. Body 26 has a peripheral flange 28 at one end which engages a stop in the form of peripheral rib 30 on sealing flange 20. A peripheral, resilient, electrically conductive bonding wire 29 is mounted in the inner peripheral edge of flange 28 and contacts the outer surface of sealing flange 20 to provide electrical continuity from flange 20, through the coupling 10, to flange 14. The opposite end of coupler 25 is provided with external threads 32.

A second coupling member in the form of nut 34 is mounted on flange 14 and has a generally cylindrical body 35 with a peripheral flange 36 which has a similar bonding wire 37 in contact with the outer surface of sealing flange 14 to provide electrical continuity. Nut 34 has internal threads 38 which engage threads 32 of coupler 25 so that the coupler 25 and nut 34 can be drawn together longitudinally into a locked position, as will be more fully explained below.

A locking element in the form of a lock ring 40 is mounted about the outer periphery of coupler 25 by means of annular spring 42 for longitudinal movement with respect to coupler 25 and nut 34, as more fully described below. The structure of coupler 25, nut 34, lock ring 40, and annular spring 42 can best be understood by looking at FIGS. 3–7.

Figure 2:
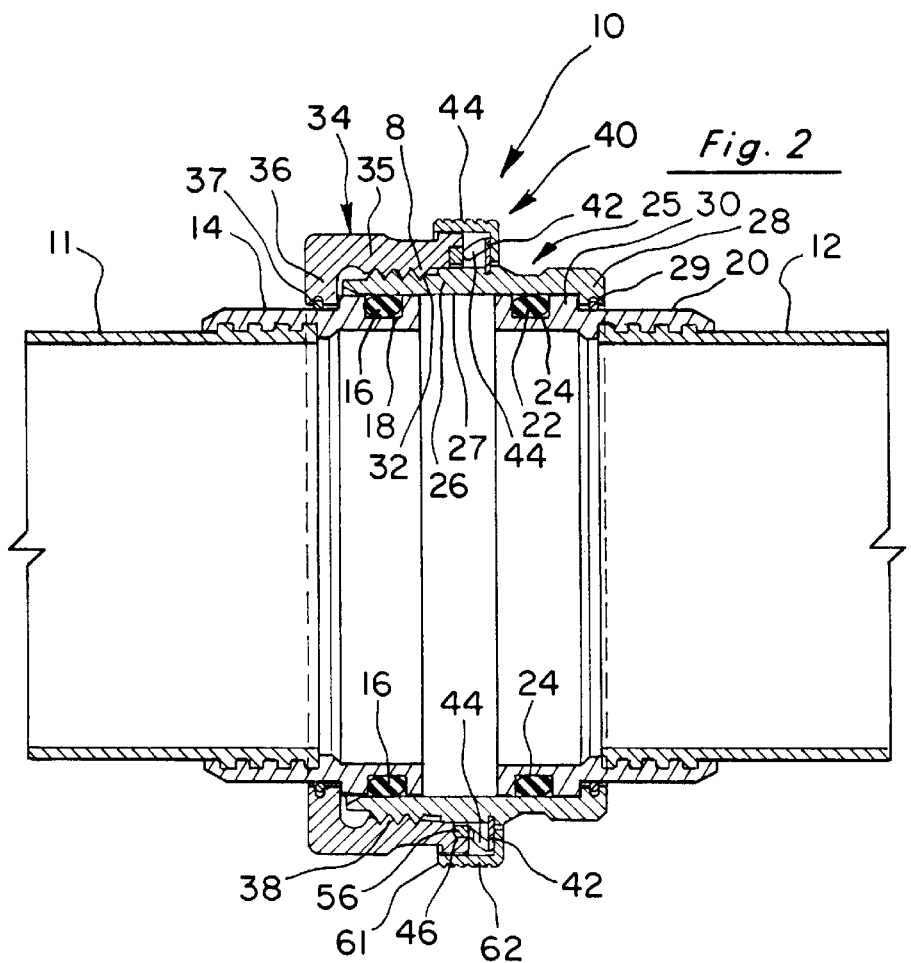
FIG. 2 is an enlarged longitudinal section, taken along line 2—2 of FIG. 1, showing details of the coupling.

Annular spring 42 includes about its outer periphery a plurality of spring fingers 44 which extend at an angle to the plane of annular spring 42, as best seen and FIG. 4a. Although four fingers have been shown, it will be apparent to one of ordinary skill in the art that a lesser or greater number could be provided. Also, the fingers can be arranged to extend from the opposite side of the annular spring. Annular spring 42 is mounted within peripheral groove 46 on coupler 25 by spring tabs 48. These tabs are illustrating as extending from the inner peripheral edge 49 of annular spring 42 opposite the juncture of spring fingers 44 with the annular spring 42, but can be positioned anywhere around the inner peripheral edge. A larger or lesser number of tabs could be provided. As shown in FIGS. 4 and 5, a key 50, which also extends from the inner periphery of annular spring 42, is received in keyway 52 in coupler 25 for positioning annular spring 42 in fixed rotational position with respect to coupler 25. Prior to mounting lock ring 40 on coupler 25, annular spring 42 is deformed so as to be snapped into an internal peripheral retaining groove 54 formed in lock ring 40 between annular wall or web 56 and depending peripheral shoulder 58 so that the spring fingers 44 contact the web 56. Once annular spring 42 is positioned within lock ring 40, this assembly is slid over threads 32 of coupler 25 until the spring tabs 48 of the inner peripheral edge 49 of spring 42 is received in peripheral groove 46, as best seen in FIGS. 2 and 8. Conveniently, lock ring 40 has a peripheral flange 61 with a scored outer surface 62 for grasping the lock ring to move it laterally against the force of spring fingers 44, all as more fully discussed below.

Advantageously, web 56 of lock ring 40 is a peripheral facing surface which has a first complementary locking element which has configurations in the form of negative reliefs in the form of a relatively long narrow annular slot 64 and relatively wide short annular slot 66 located opposite each other. Stated another way, annular slot 64 is radially narrower than is annular slot 66. The center of the annular slots, as measured from end to end, are spaced 180° from each other. A wide key 68 and a narrow opposing key 70 are provide on web 56 between annular slots 64 and 66. Conveniently, key 50 on annular spring 42 is aligned with wide key 68 when the annular spring is placed within the lock ring, as previously described. Thus, when this assembly is slid over the threads of coupler 25, wide key 68 is received in keyway 52 on coupler and narrow key 70 is received in narrow keyway 71 on the opposite side of coupler 25 from keyway 52 in order to properly align all of the parts.

Cylindrical body 35 of nut 34 has an exterior gripping surface 72 at the proximal end thereof and has indicia in the form of an indicator stripe 74 extending about the distal end of body 35. Extending from facing surface 75 at the distal end of body 35 is a second complementary locking element which is a protrusion having configurations in the form of a long, but radially narrow arcuate locking tab 76 and a short, but radially wide arcuate locking tab 78 located 180° from arcuate locking tab 76. These tabs are positioned and sized to be received within arcuate slots 64 and 66, respectively, of web 56 on lock ring 40.

Figure 11:
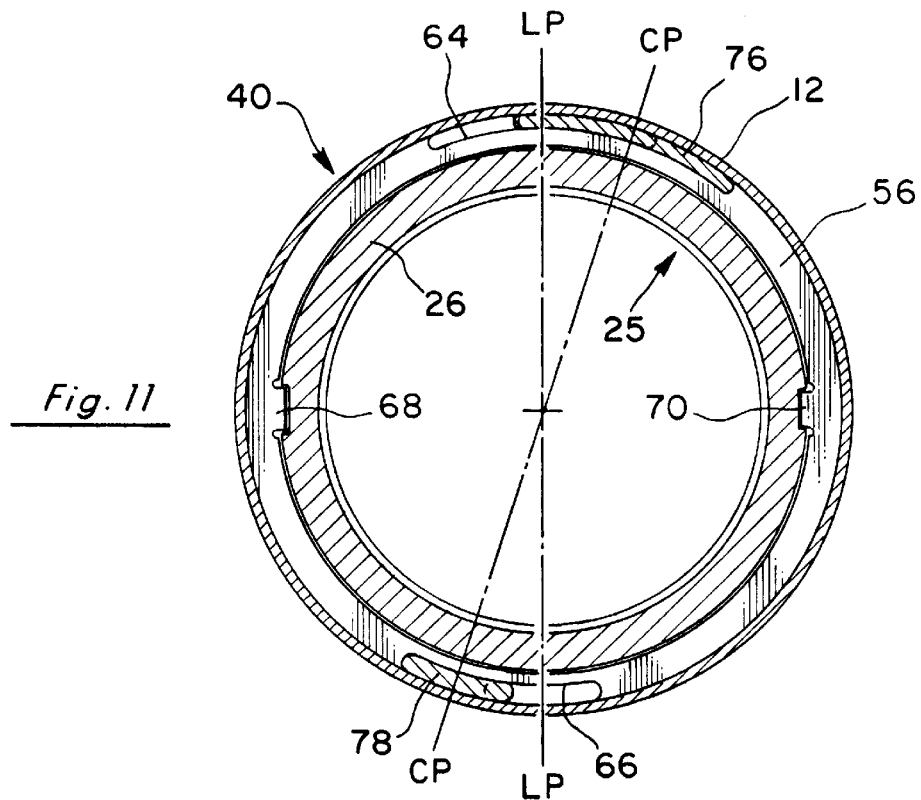
FIG. 11 is a vertical section, on a reduced scale, taken along line 11—11 of FIG. 8, showing the position of the nut when the confronting surfaces of the respective coupling members are brought into initial contact as they are threaded in the locking direction.
Figure 12:
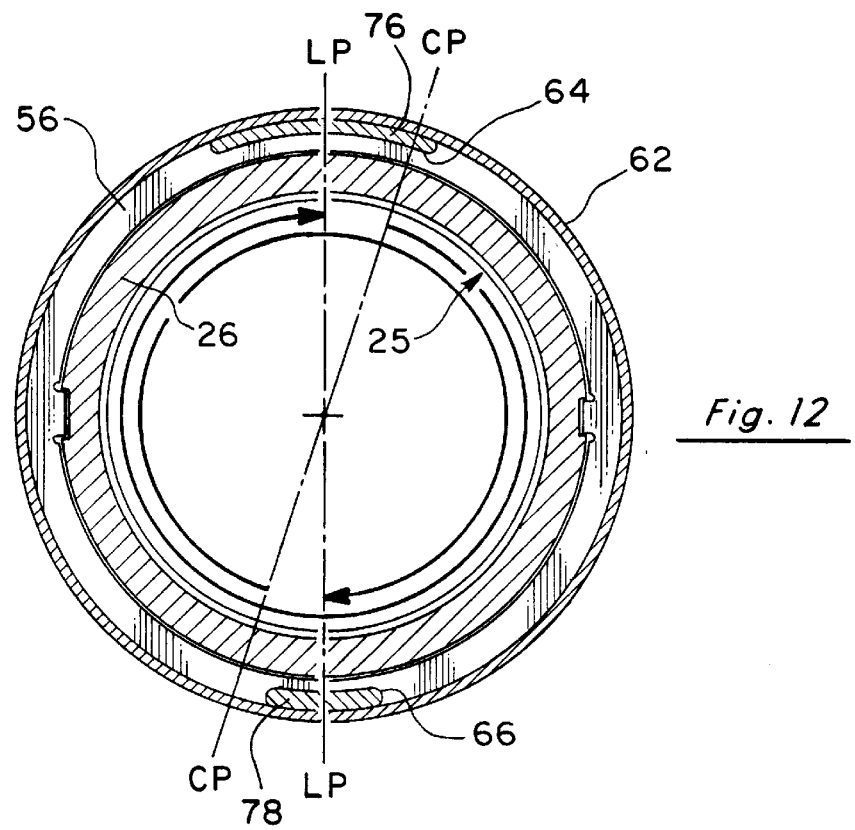
FIG. 12 is a vertical section, on a reduced scale, taken along line 12—12 of FIG. 10, showing the position of the nut when the coupling members are in a locked position.

From the foregoing, the operation the of the coupling will be apparent. After annular spring 42 has been placed within lock ring 40 and this assembly positioned on coupler 25, as previously described, nut 34 is threaded onto coupler 25. The threads 32 of the coupler 25 and threads 38 of nut 34 are located with respect to angular position and pitch so that long arcuate locking tab 76 and short arcuate locking tab 78 on nut 34 first engage web 56 of lock ring 40 in the rotational position CP shown in FIG. 11. When in this position, the facing surfaces of coupler 25 and lock ring 40 are brought together during rotation so that short arcuate locking tab 78 is positioned slightly clockwise past short arcuate slot 66 and long arcuate locking tab 76 is positioned slightly clockwise past long arcuate slot 64 when the respective locking tabs first come into contact with web 56. Upon further rotation, short arcuate locking tab 78 will become aligned with long arcuate slot 64 and long arcuate locking tab 76 will become aligned with short arcuate slot 66. However, since short arcuate locking tab 78 is radially thicker or wider than long arcuate slot 64, it cannot engage long arcuate slot 64 but rides along the surface of web 56. Conversely, since long arcuate locking tab 76 extends beyond the ends of short arcuate slot 66, it cannot enter arcuate slot 66 but rides along the surface of web 56. As nut 34 continues to be tightened, spring fingers 44 are compressed from the position shown in FIG. 8 to the position shown in FIG. 9 allowing lock ring 40 to move to the right relative to coupler 25 from the position shown in FIG. 8 to the position shown in FIG. 9. Advantageously, the arcuate locking tabs are raised above the facing surface 75 of body 35 a distance at least equal to the width of indicator stripe 74. Thus, indicator stripe 74 is visible to indicate that the coupling has not yet snapped into locked position. As nut 34 continues to be tightened slightly less than one full turn, it will reach locking position LP, in FIG. 12 wherein long locking tab 76 comes into alignment with long arcuate slot 64 and short locking tab 78 comes into alignment with short arcuate slot 66 so that locking ring 40 snaps to the left, as viewed in FIG. 10, under the force of spring fingers 44 to bring long locking tab 76 and short locking tab 78 into locking engagement with long arcuate slot 64 and short arcuate slot 66, respectively. By this action, locking ring 40 moves against annular spring 42 which serves as a retaining member to limit the longitudinal movement of lock ring 40. When this happens, indicator stripe 74 is no longer visible since the peripheral flange 61 of lock ring 40 moves over and covers the indicator stripe. Thus, nut 34 is securely engaged in a locking relationship with respect to lock ring 40 and, since the keys 68 and 70 of lock ring 40 are rotationally engaged with the keyways 52 and 71 of coupler 25, the nut 34 is securely engaged in a locking relationship with respect to coupler 25.

Figure 9:
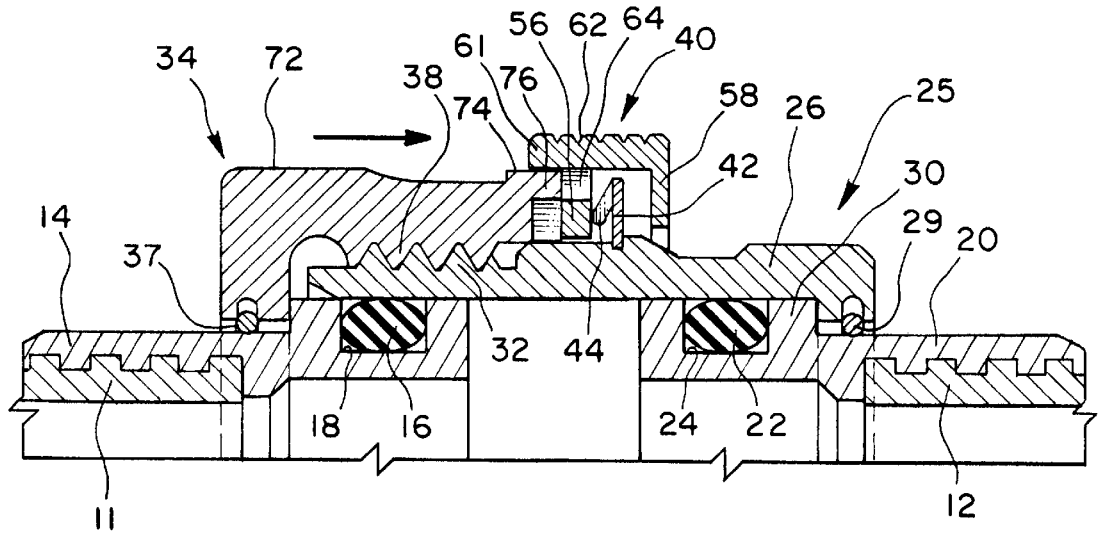
FIG. 9 is a fragmentary vertical section, similar to the upper portion of FIG. 8, showing the position of the coupling assembly just prior to reaching the position for locking engagement.
Figure 10:
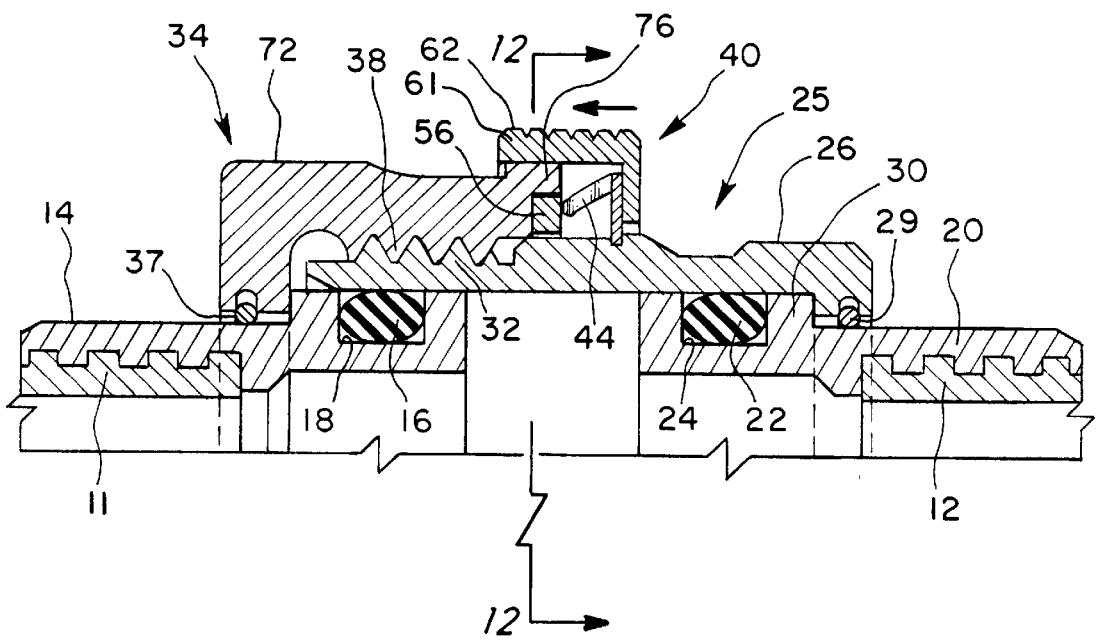
FIG. 10 is a fragmentary vertical section, similar to FIG. 9, but showing the position of the coupling assembly in locking engagement.

To release the coupling, the mechanic need only to push lock ring 40 to the right, as viewed in FIGS. 8–10, to disengage long locking tab 76 and short locking tab 78 from long arcuate slot 64 and short arcuate slot 66, respectively. Then, the mechanic can rotate nut 34 in the unlocking direction whereupon the locking tabs and their respective arcuate slots are no longer aligned. The lock ring 40 can be released as further rotation of nut 34 in the unlocking direction continues. It will be apparent that the mechanic can accomplish both the locking and unlocking of the coupling assembly 10 with one hand. This is important in the limited space in which a mechanic must work within an aircraft.

Figure 15:
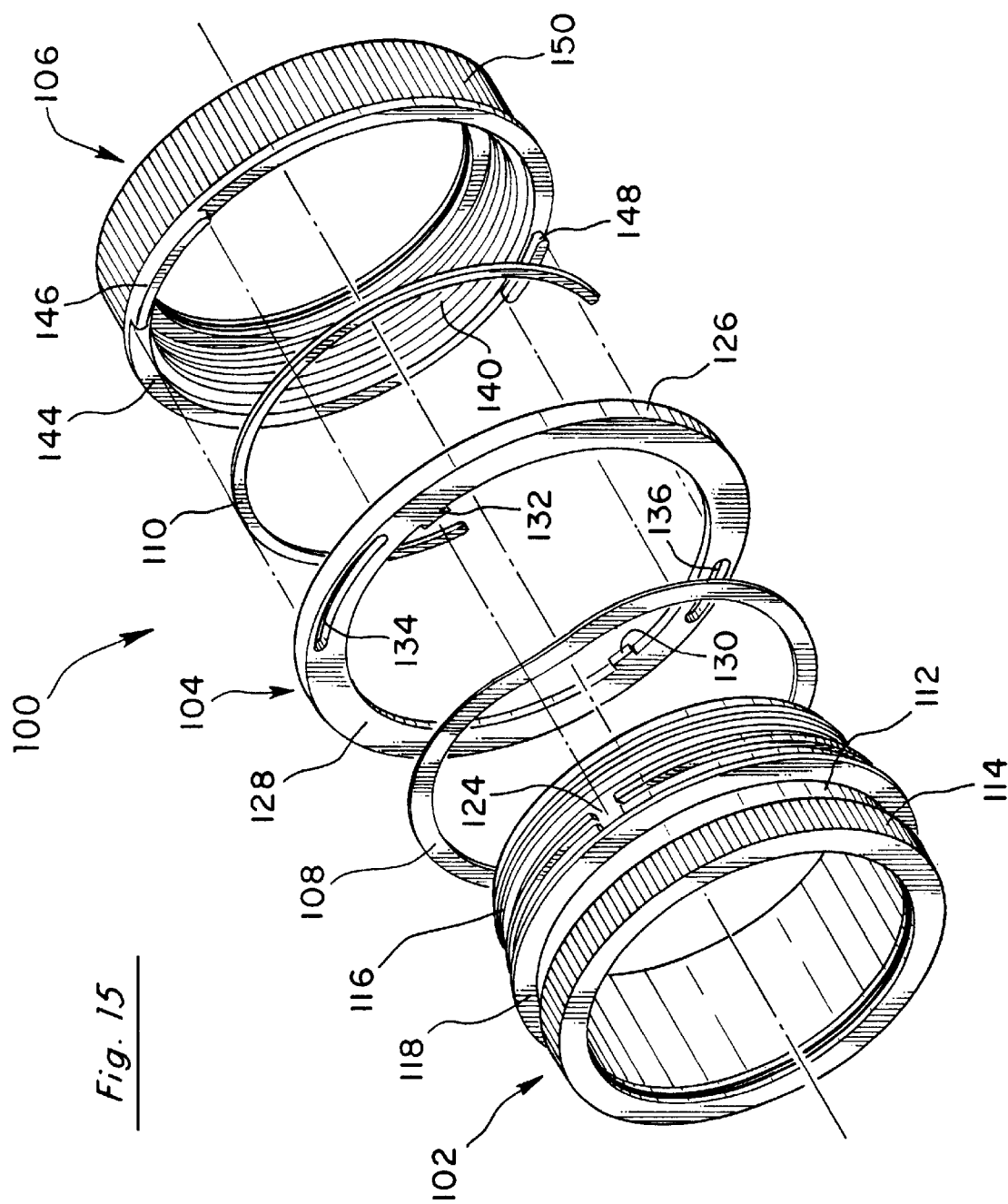
FIG. 15 is an exploded perspective view of the coupling of FIG. 13.

An alternative embodiment is shown in FIGS. 13–32 wherein a different form of spring is used in combination with a snap ring to provide a positive lock coupling with indicia for viewing whether or not the coupling assembly is in a positive locked position. As best seen in FIGS. 13–15, sealing flanges 14 and 20 of conduits 11 and 12, respectively, are joined together in fluid communication by coupling assembly 100. Coupling assembly 100 comprises a coupler 102, a lock ring 104 and a nut 106, together with annular wave or undulating spring 108 and snap ring 110.

Coupler 102 has a generally cylindrical body 112 with an outer gripping surface 114 at one end and external peripheral threads 116 adjacent the opposite end. A peripheral radial flange 118 extends from body 112 between gripping surface 114 and threads 116 and serves as a stop for annular wave spring 108. A snap ring retaining groove 120 is provided between flange 118 and threads 116, as shown. Conveniently, a narrow keyway 122 and a wide keyway 124 are provided opposite each other on body 112, as best seen in FIG. 16.

As shown in FIGS. 15 and 21, lock ring 104 has a peripheral flange 126 extending laterally from annular web 128 which serves as a peripheral facing surface. Extending inwardly from annular web 128 on opposite sides thereof is a narrow tab 130 and a wide tab 132 which are sized to be received in narrow keyway 122 and wide keyway 124, respectively, of coupler 102 to angularly position lock ring 104 with respect to coupler 102. Web 128 also includes complementary locking elements having configurations which are negative reliefs in the form of a long annular slot 134, which has a relatively narrow width in the radial direction, and a short annular slot 136 located opposite long slot 134 and had a relatively wide width in the radial direction. These slots will provide a means for positive locking engagement with nut 106, as more fully explained below.

Nut 106 has a generally cylindrical body 107 with internal threads 140 which are engageable with threads 116 of coupler 102. Body 107 also has indicia in the form of an indicator stripe 142 which provides the mechanic with a visual indication of whether or not the coupling assembly is in a positive locked position. The edge 144 is a peripheral facing surface which has a complementary locking element such as protrusions whose configurations are in the form of a long arcuate locking tab 146, which is relatively narrow in the radial direction, and an opposite short arcuate locking tab 148 which is relatively thick in the radial direction. Conveniently, nut 106 has an exterior gripping surface 150 for assisting the mechanic in rotating the nut in either the locking or unlocking direction.

Figure 31:
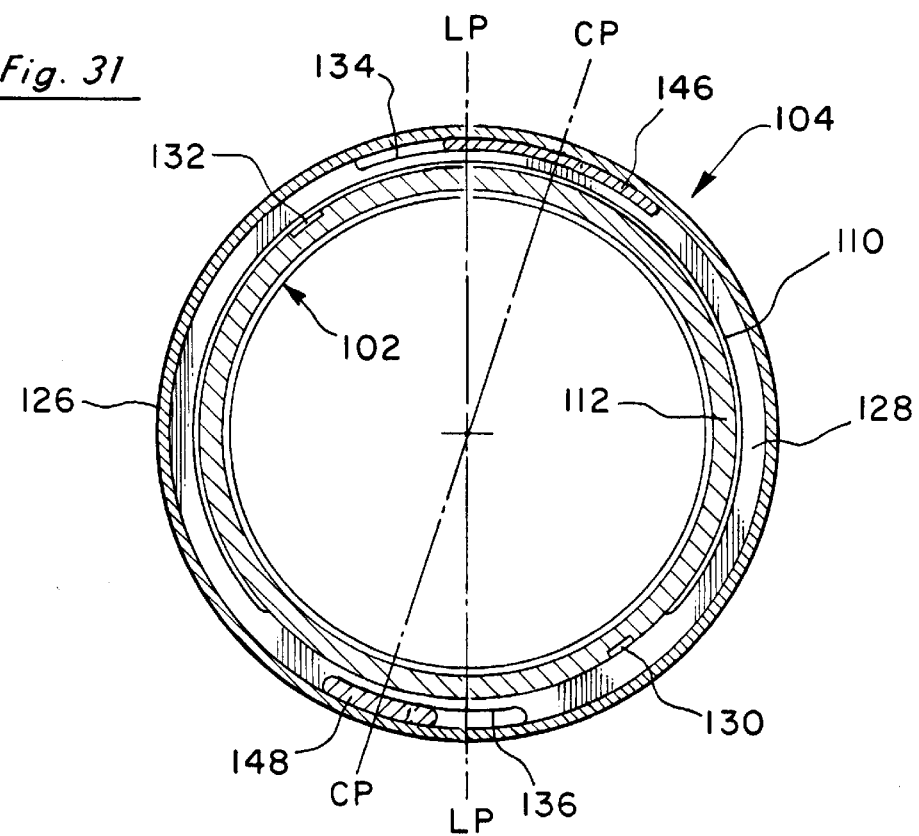
FIG. 31 is vertical section, taken along line 31—31 of FIG. 28 showing the position of the nut when the confronting surfaces of the respective coupling members are first brought into contact as they are threaded in the locking direction.
Figure 32:
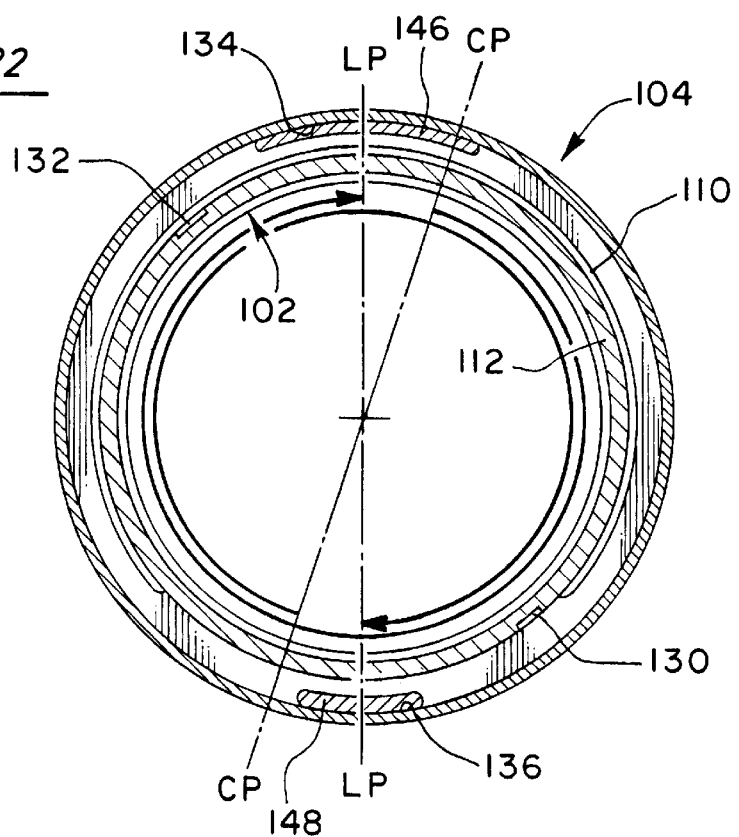
FIG. 32 is a vertical section, similar to FIG. 31, but showing the position of the nut when engaged.

To fasten coupling assembly 100, first, annular wave spring 108 is slid over threads 116 of coupler 102 until it abuts flange 118. Next lock ring 104 is slid over threads 116 and is positioned so that wide tab 132 is aligned with wide keyway 124 and narrow tab 130 is aligned with narrow keyway 122 to properly orient lock ring 104 with coupler 102. Next, snap ring 110 is snapped into groove 120 on coupler 102 to retain annular wave spring 108 and lock ring 104 in position on coupler 102. Nut 106 is threaded onto coupler 102 to draw their facing surfaces toward one another. The orientation of the threads with respect to long arcuate slot 134 and short arcuate slot 136 in lock ring 104 is such that when long arcuate locking tab 146 and short arcuate locking tab 148 first come into contact with web 128 they are oriented along contact point CP as shown in FIG. 31. When in this orientation, short arcuate locking tab 148 is positioned slightly beyond short arcuate slot 136 and long arcuate locking tab 146 is rotationally positioned slightly beyond long arcuate slot 134. Upon further rotation, short arcuate locking tab 148 will become aligned with long arcuate slot 134 and long arcuate locking tab 146 will become aligned with short arcuate slot 136. However, since short arcuate locking tab 148 is thicker or wider in the radial direction, this short arcuate locking tab 148 cannot enter long arcuate slot 134. Likewise, long arcuate locking tab 146 is rotationally positioned slightly beyond long arcuate slot 134. As rotation of nut 106 continues with respect to coupler 102, wave spring 108 is compressed thereby moving lock ring 126 to the left as viewed in FIG. 29 so that indicator stripe 142 is exposed. Because the depth of the arcuate locking tabs is at least as great as the width of indicator stripe 142, the indicator stripe 142 continues to be exposed. However, when the angular rotation reaches locking position LP, shown in FIG. 32, long arcuate locking tab 146 becomes aligned with long arcuate slot 134 and short arcuate locking tab 148 simultaneously becomes aligned with short arcuate slot 136. Accordingly, lock ring 104 snaps to the right from the position shown in FIG. 29 to the position shown in FIG. 30 thereby providing positive locking engagement between nut 106 and coupler 102. When in the positive locked position shown in FIG. 30, indicator stripe 142 is completely covered by flange 126 of lock ring 104. Snap ring 110 serves as a retaining member to limit the longitudinal movement of lock ring 104.

In order to unlock coupling assembly 100, the mechanic slides lock ring 104 to the left, as viewed in FIGS. 28–30, so that long annular locking tab 146 is disengaged from long annular slot 134 and short annular locking tab 148 is disengaged from short annular slot 136. While holding the lock ring 104 in this position, the mechanic begins to rotate nut 106 in the unlocking direction until the arcuate tabs and slots are no longer aligned. Rotation is continued in the unlocking direction to disengage coupling assembly 100.

It will be understood that the pitch of the threads on the coupling can be modified so that the maximum relative rotation between the coupling parts, once contact of the facing surfaces occurs, can be varied.

From the foregoing, the advantage of this invention are readily apparent. A coupling assembly has been provided in the various embodiments wherein a positive engagement is obtained between the nut and the coupler which can be accomplished with one hand. Also, indicia in the form of an indicator stripe is provided which shows the mechanic whether or not the coupling is in the positive lock position. Although the complementary locking elements in both embodiments have been illustrated as arcuate tabs and slots, it will be understood that other complementary shapes or configurations which can releasably engage each other could be used.

This invention has been described in detail with reference to particular embodiments thereof, but it will be understood that various other modifications can be effected without departing from the spirit and scope of this invention.

What is claimed is:

1. A threaded coupling apparatus for interconnecting ends of first and second fluid-carrying conduit members in a fixed releasable locking relationship, said apparatus comprising:

first and second coupling members circumferentially engageable with the ends of the conduit members to hold them in fluid communication, said coupling members being rotatable with respect to each other in a locking direction to a locked position and in an opposite unlocking direction to unfasten said coupling apparatus;

a peripheral facing surface located on each of said first and second coupling members, one of said peripheral facing surfaces having first complementary locking elements in the form of a first relief of a first configuration and a second relief of a second and different configuration, said second relief being spaced peripherally from said first relief, the other for cooperatively mating with said peripheral facing surface having second complementary locking elements in the form of a first protrusion of said first configuration and a second protrusion for cooperatively mating with said second configuration, said second protrusion being peripherally spaced from said first protrusion so that when said first protrusion is aligned with said first relief, said second protrusion also is aligned with said second relief so that one of said peripheral facing surfaces is movable axially toward the other of said peripheral facing surfaces to snap said first and second protrusions into said first and second reliefs, respectively, to positively lock said first and second coupling members in the fixed rotational position;

cooperating threads on said first and second coupling members for moving said first and second peripheral facing surfaces toward each other when said coupling members are rotated with respect to each other to said locked position; and a resilient member adjacent one of said first and second complementary locking elements for urging said peripheral facing surfaces toward each other so that one of said first or second complementary locking elements on one of said peripheral facing surfaces contacts and subsequently locks into the other of said peripheral facing surfaces when said first and second complementary locking elements become aligned to hold them in a fixed rotational and locked position.

2. Apparatus, as claimed in claim 1, said resilient member further comprising:

an annular ring;

a plurality of peripherally spaced resilient fingers formed on said annular ring for urging one of said peripheral facing surfaces against said peripheral facing surface of said other of said first and second coupling members.

3. Apparatus, as claimed in claim 1, wherein:

said first relief and said first protrusion are of a first length and width; and said second relief and said second protrusion are of a second and different length and width from said first relief and said first protrusion, respectively.

4. Apparatus, as claimed in claim 3, wherein:

each of said first and second reliefs are arcuate slots; and each of said first and second protrusions are arcuate locking tabs.

5. Apparatus, as claimed in claim 4, wherein said arcuate locking tabs have a predetermined height and said other of said coupling members has an outer periphery, said apparatus further including:

a lock ring which includes one of said peripheral facing surfaces, said resilient member being mounted within and supporting said lock ring and being attached to one of said first and second coupling members to urge said one of said peripheral facing surfaces toward said other of said peripheral facing surfaces on the other of said first and second coupling members; and an indicator stripe extending around said outer periphery of said other of said coupling members having a width no greater than the predetermined height of said arcuate locking tabs so that when said arcuate locking tabs engage said arcuate slots, said lock ring moves longitudinally to cover said indicator stripe.

6. Apparatus, as claimed in claim 1, further including:

a locking ring, which includes one of said peripheral facing surfaces, mounted peripherally about one of said first and second coupling members;

a peripheral flange on said one of said first and second coupling members, said resilient member being positioned between said peripheral flange and said locking ring for urging said peripheral facing surface and said locking ring axially toward said peripheral surface of said other of said first and second coupling members; and said resilient member is a retaining member for limiting the axial movement of said locking ring.

7. Apparatus, as claimed in claim 6, wherein:

said resilient member is an annular wave spring.

8. A threaded coupling apparatus for interconnecting ends of first and second fluid-carrying conduit members in a fixed releasable locking relationship, said apparatus comprising:

first and second coupling members circumferentially engageable with the ends of the conduit members to hold them in fluid communication, said coupling members being rotatable with respect to each other in a locking direction to a locked position and in an opposite unlocking direction to unfasten said coupling apparatus;

a peripheral facing means located on each of said first and second coupling members, one of said peripheral facing means having first complementary locking elements in the form of a first relief of a first configuration and a second relief of a second and different configuration, said second relief being spaced peripherally from said first relief, and the other of said peripheral facing means having second complementary locking elements in the form of a first protrusion for cooperatively mating with said first configuration and a second protrusion said second configuration and peripherally spaced from said first protrusion so that when said first protrusion is aligned with said first relief, said second protrusion also is aligned with said second relief so that one of said peripheral facing means is movable axially toward the other of said peripheral facing surfaces to snap said first and second protrusions into said first and second reliefs, respectively, to positively lock said first and second coupling members in the fixed rotational position;

cooperating threads on said first and second coupling members for moving said first and second peripheral facing surfaces toward each other when said coupling members are rotated with respect to each other to said locked position; and resilient means adjacent one of said first and second complementary locking means for urging said peripheral facing means toward each other so that said first and second complementary locking means on one of said peripheral facing means contacts and subsequently locks into the other of said peripheral facing means when said first and second complementary locking means become aligned to hold them in a fixed rotational and locked position.

9. Apparatus, as claimed in claim 8, said resilient means further comprising:

an annular ring;

a plurality of peripherally spaced resilient fingers formed on said annular ring for urging one of said peripheral facing means against said peripheral facing means of said other of said first and second coupling members.

10. Apparatus, as claimed in claim 8, wherein:

said first relief and said first protrusion are of a first length and width; and said second relief and said second protrusion are of a second and different length and width from said first relief and said first protrusion, respectively.

11. Apparatus, as claimed in claim 10, wherein:

each of said first and second reliefs are arcuate slots; and each of said first and second protrusions are arcuate locking tabs.

12. A method of releasably locking ends of first and second fluid carrying conduit members in a fixed relationship, said method comprising the steps of:

providing first and second threaded coupling members with respective peripheral facing surfaces, each having a locking means located thereon;

engaging each locking element with the peripheral facing surface of the other coupling member;

rotating the threaded coupling members through a predetermined annular rotation to draw them longitudinally toward each other;

longitudinally moving the complementary locking elements after a predetermined angular rotation of the first and second coupling members with respect to each other to engage and positively lock the first and second coupling members to prevent further relative angular rotation therebetween;

providing an indicator stripe around the periphery of one of the coupling members which is visible during coupling; and covering the indicator stripe when the locking elements become engaged.

13. A method, as claimed in claim 12, including the further steps of:

uncovering the indicator stripe; and rotating the threaded coupling members in an opposite direction to uncouple the coupling members.

14. A method of releasably interconnecting ends of first and second coupling members, having first and second peripherally facing surfaces, respectively, which are attached to first and second fluid-carrying conduit members, respectively, said method including the steps of:

providing a first relief having a first configuration and a second relief having a second and different configuration on the first peripheral facing surface, the second relief being spaced peripherally from the first relief;

providing a first protrusion for cooperatively mating with the first configuration and a second protrusion for cooperatively mating with the second configuration on the second peripheral facing surface, the second protrusion being spaced peripherally from the first protrusion so that when the first protrusion is aligned with the first relief, the second protrusion is aligned with the second relief;

aligning the first protrusion with the first relief and the second protrusion with the second relief; and moving the first and second peripheral facing surfaces toward each other to bring the first protrusion into locked engagement within the first relief and the second protrusion into locked engagement with the second relief to releasably interconnect the ends of the first and second coupling members.

15. A method, as claimed in claim 14, wherein:

the first relief and the first protrusion are of a first length and a width; and the second relief and the second protrusion are of a second and different length and width from the first relief and the first protrusion, respectively.

16. A method, as claimed in claim 15, wherein:

each of the first and second reliefs are arcuate slots; and each of the first and second protrusions are arcuate locking tabs.

17. A method of releasably interconnecting ends of first and second coupling members, having first and second confronting pipe ends, respectively, which are attached to first and second fluid-carrying conduit members, respectively, said method including the steps of:

providing an externally threaded coupler on one of the pipe ends;

positioning a lock ring, which has first peripherally spaced locking elements, on the coupler adjacent the threads for longitudinal movement therealong;

providing a rotatable nut, having internal threads and second peripherally spaced locking elements, on the other of the pipe ends;

threading the nut on the coupler so that the nut engages and displaces the lock ring longitudinally away from the coupler threads and to interconnect the ends the first and second coupling members;

aligning the first and second peripherally spaced locking elements during threading of the nut on the coupling; and moving the lock ring in the opposite direction to engage the first and second peripherally spaced locking elements.

* * * * *

UNITED STATES PATENT AND TRADEMARK OFFICE
CERTIFICATE OF CORRECTION

PATENT NO.   : 5,871,239
DATED         : February 16, 1999
INVENTOR(S)  : Ronald W. Boscaljon et al.

It is certified that error appears in the above-identified patent and that said Letters Patent is hereby corrected as shown below:

Column 8,
Line 55, after "other" insert -- of --;
Line 55, delete "for cooperatively";
Line 56, delete "mating with";
Line 58, delete "of";
Line 58, before "said" insert -- for cooperatively mating with --;
Line 59, delete "for cooperatively mating with"; and Column 10,
Line 21, after "protrusion" insert -- for cooperatively mating with --.

Signed and Sealed this

Twenty-fifth Day of February, 2003

JAMES E. ROGAN
*Director of the United States Patent and Trademark Office*